(12) United States Patent
Mangalam

(10) Patent No.: US 9,547,628 B2
(45) Date of Patent: Jan. 17, 2017

(54) METHOD AND APPARATUS FOR IMPROVING TEXT LEGIBILITY BY AUTOMATICALLY ADJUSTING ZOOM LEVEL BASED ON PREFERRED FONT CHARACTERISTICS INCLUDING HEIGHT, WEIGHT, AND CONDENSATION

(71) Applicant: Adobe Systems Incorporated, San Jose, CA (US)

(72) Inventor: Apoorv Mangalam, Lucknow (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 417 days.

(21) Appl. No.: 14/068,682

(22) Filed: Oct. 31, 2013

(65) Prior Publication Data

US 2015/0121210 A1  Apr. 30, 2015

(51) Int. Cl.
*G06F 17/21* (2006.01)
(52) U.S. Cl.
CPC ................................. *G06F 17/214* (2013.01)
(58) Field of Classification Search
CPC .................................................... G06F 17/214
USPC .................................................. 715/269, 864
See application file for complete search history.

(56) References Cited

U.S. PATENT DOCUMENTS

| 5,185,818 A * | 2/1993 | Warnock | G06F 17/214 345/471 |
| 5,398,306 A * | 3/1995 | Karow | B41B 19/00 358/1.11 |
| 5,664,086 A * | 9/1997 | Brock | G06K 15/02 345/468 |
| 5,754,873 A * | 5/1998 | Nolan | G06F 3/0481 345/472 |
| 5,803,629 A * | 9/1998 | Neville | G06F 17/214 400/304 |
| 5,859,648 A * | 1/1999 | Moore | G06F 17/214 345/471 |
| 6,073,148 A * | 6/2000 | Rowe | G06F 17/211 345/471 |
| 6,131,103 A * | 10/2000 | Yun | G09G 5/14 345/472 |
| 6,552,728 B1 * | 4/2003 | Moore | G06F 17/214 345/467 |
| 6,927,773 B2 * | 8/2005 | Momozono | G09G 5/26 345/467 |
| 6,986,103 B1 * | 1/2006 | Beezer | G06F 17/211 715/200 |
| 7,773,089 B2 * | 8/2010 | Nakamura | G06F 17/26 345/467 |
| 2002/0010723 A1 * | 1/2002 | Nielsen | G06F 17/30905 715/269 |

(Continued)

FOREIGN PATENT DOCUMENTS

EP  0583548 A1 *  2/1994  ........... G06F 17/214

*Primary Examiner* — Cesar Paula
*Assistant Examiner* — Yahao Chen
(74) *Attorney, Agent, or Firm* — Keller Jolley Preece

(57) ABSTRACT

A computer implemented method and apparatus for automatically improving legibility based on preferred font characteristics. The method comprises determining a plurality of preferences regarding font size characteristics of sample text; receiving a request to view an electronic document having text in a given font; and displaying text of the electronic document in the given font with a zoom level based on the preferences.

20 Claims, 5 Drawing Sheets

(56) References Cited

U.S. PATENT DOCUMENTS

| | | | |
|---|---|---|---|
| 2003/0179232 A1* | 9/2003 | Fousek | G06F 17/50 715/762 |
| 2004/0114804 A1* | 6/2004 | Tanioka | G06K 15/1828 382/187 |
| 2004/0119714 A1* | 6/2004 | Everett | G06F 17/214 345/471 |
| 2004/0253568 A1* | 12/2004 | Shaver-Troup | G09B 17/00 434/178 |
| 2005/0010869 A1* | 1/2005 | Truelove | G06F 17/214 715/275 |
| 2006/0017733 A1* | 1/2006 | Matskewich | G09G 5/246 345/467 |
| 2006/0103667 A1* | 5/2006 | Amit | G06F 17/211 345/619 |
| 2006/0195784 A1* | 8/2006 | Koivisto | G06F 17/212 715/234 |
| 2007/0094591 A1* | 4/2007 | Etgen | G06F 17/227 715/234 |
| 2008/0266298 A1* | 10/2008 | Hess | G01C 21/3673 345/467 |
| 2009/0109227 A1* | 4/2009 | Leroy | G06F 17/214 345/467 |
| 2009/0213422 A1* | 8/2009 | Ono | G06K 15/1836 358/1.15 |
| 2009/0276697 A1* | 11/2009 | Mielke | G06F 17/212 715/252 |
| 2010/0017708 A1* | 1/2010 | Tomida | G09G 5/26 715/269 |
| 2010/0299395 A1* | 11/2010 | Klassen | G06F 17/214 709/206 |
| 2011/0072390 A1* | 3/2011 | Duga | G06F 3/0481 715/800 |
| 2012/0110438 A1* | 5/2012 | Peraza | G06F 17/214 715/243 |
| 2012/0229517 A1* | 9/2012 | Plummer | G06F 17/214 345/660 |
| 2013/0009962 A1* | 1/2013 | Lindfors | G06T 3/40 345/472 |
| 2013/0033498 A1* | 2/2013 | Linnerud | G06F 9/3017 345/467 |
| 2013/0106907 A1* | 5/2013 | Davis | G06F 3/0488 345/629 |
| 2013/0111332 A1* | 5/2013 | Davis | G06F 3/0488 715/247 |
| 2013/0111333 A1* | 5/2013 | Taleghani | G06F 17/211 715/252 |
| 2013/0127703 A1* | 5/2013 | Wendt | G06F 17/211 345/156 |
| 2013/0198617 A1* | 8/2013 | Maloney | G06F 17/211 715/252 |
| 2014/0002428 A1* | 1/2014 | Letourneur | G09G 3/34 345/207 |
| 2014/0285494 A1* | 9/2014 | Jo | G09G 5/24 345/471 |
| 2014/0365881 A1* | 12/2014 | Suarez | G06F 17/214 715/269 |
| 2015/0046802 A1* | 2/2015 | Liang | G06F 17/30905 715/255 |
| 2015/0062140 A1* | 3/2015 | Levantovsky | G09G 5/37 345/581 |
| 2015/0084966 A1* | 3/2015 | Sood | G06F 17/214 345/467 |

* cited by examiner

METHOD AND APPARATUS FOR IMPROVING TEXT LEGIBILITY BY AUTOMATICALLY ADJUSTING ZOOM LEVEL BASED ON PREFERRED FONT CHARACTERISTICS INCLUDING HEIGHT, WEIGHT, AND CONDENSATION

BACKGROUND

Field of the Invention

Embodiments of the present invention generally relate to electronic readers and, more particularly, to a method and apparatus for automatically improving legibility based on preferred font characteristics.

Description of the Related Art

When reading an electronic document, it is preferable for the text, regardless of the font, to be legible, or in a size that can be easily read. However, what is legible and easy to read to one user may not be legible and easy to read to another user. A user who is far-sighted may want the text to be large and bold to make the text more legible. A user who is near-sighted may find a small font size to be more legible. Hence, legibility is a preference personal to each individual user. Typically, each time a user opens an electronic document, the user must adjust the zoom level in an electronic display in order to change the size of the text to a size that is more comfortable to the user. This is inconvenient and provides a poor user experience.

Therefore, there is a need for a method and apparatus for automatically improving legibility based on preferred font characteristics.

SUMMARY

A method for automatically improving legibility based on preferred font characteristics is described. The method determines a plurality of user preferences regarding a plurality of font size characteristics of sample text. Upon receiving a request to view an electronic document having text in a given font, the method displays the text of the electronic document in the given font with a zoom level based on the user preferences.

In another embodiment, an apparatus for automatically improving legibility based on preferred font characteristics is described. The apparatus includes a preference determination module for determining a plurality of user preferences regarding a plurality of font size characteristics of sample text. The apparatus also includes a text modification module for displaying text of an electronic document with a zoom level based on the user preferences.

In yet another embodiment, a computer readable medium for automatically improving legibility based on preferred font characteristics is described. The computer readable medium stores computer instructions that, when executed by a processor cause the processor to perform a method for automatically improving legibility based on preferred font characteristics. The method determines a plurality of user preferences regarding a plurality of font size characteristics of sample text. Upon receiving a request to view an electronic document, the method displays the text of the electronic document with a zoom level based on the user preferences.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
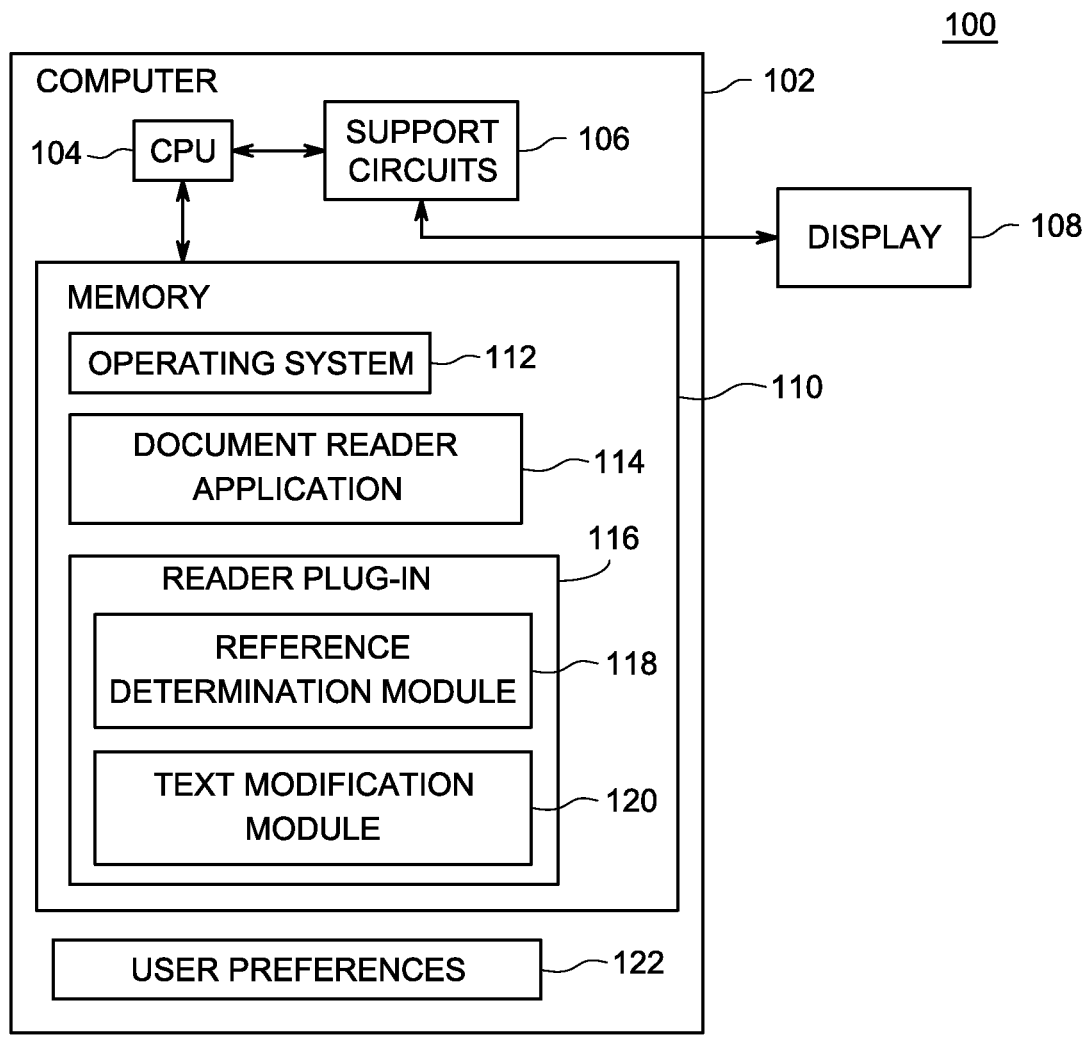
FIG. 1 is a block diagram of an apparatus for automatically improving legibility based on preferred font characteristics, according to one or more embodiments.

While the method and apparatus is described herein by way of example for several embodiments and illustrative drawings, those skilled in the art will recognize that the method and apparatus for automatically improving legibility based on preferred font characteristics is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for automatically improving legibility based on preferred font characteristics defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Although the examples in the present disclosure are provided in the English language, it is appreciated that the invention may be applied to any language.

DETAILED DESCRIPTION OF EMBODIMENTS

Embodiments of the present invention include a method and apparatus for automatically improving legibility based on preferred font characteristics. The embodiments provide a user with sample text. The user may then adjust the level of zoom such that the sample text is a size that is more legible and comfortable for the user to read. The height, weight, and condensation (i.e. width) of the adjusted text are recorded as user preferences. When a user opens an electronic document in an application, the recorded user preferences are accessed by the application. The zoom level of the text is automatically adjusted based on the recorded user preferences thereby making the text more legible to the user.

Advantageously, providers of electronic readers (sometimes referred to as e-readers), such as ADOBE® Systems Incorporated, may use the present invention as a plug-in to e-readers, such as ADOBE Reader, to improve user experience by providing displayed text in a size that is comfortable to the user. Alternatively, the present invention may be incorporated as part of the e-reader itself, or as a hosted service, as a plug-in to a browser or email client, and the like. The present invention may be used anywhere where text is displayed that includes a zoom feature.

As used herein, an electronic document is any digital document that includes text, for example a Portable Document Format (PDF) document, a WORD® document, a webpage, and the like. Legibility refers to the degree to which fonts, or more generally glyphs (individual characters) in text, are understandable or recognizable based on appearance. Font characteristics include font size characteristics such as a font height, a font weight, a font condensation of a given font or a combination of these. Text as used herein refers to a sequence of characters or glyphs.

Various embodiments of a method and apparatus for automatically improving legibility based on preferred font characteristics are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for automatically improving legibility based on preferred font characteristics, according to one or more embodiments. The apparatus 100 includes a computer 102. The computer 102 is a computing device, for example, a desktop computer, laptop, tablet computer, smartphone and any other device including one or more processors for improving legibility based on preferred font characteristics. The computer 102 includes or is attached to a display 108. The computer 102 includes a Central Processing Unit (CPU) 104, support circuits 106, and a memory 110. The CPU 104 may include one or more commercially available microprocessors or microcontrollers that facilitate data processing and storage. The support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The memory 110 includes an operating system 112, a document reader application 114, a text adjustment module 116, and user preferences 122. The text adjustment module 116 includes a preference determination module 118 and a text modification module 120. The text adjustment module 116 may be a plug-in to the document reader application 114, a part of the document reader application 114 itself, a stand-alone hosted service, or used anywhere where text is involved. The operating system 112 may include various commercially known operating systems. The document reader application 114 may be any document reader, such as ADOBE® ACROBAT®, ADOBE® READER®, ADOBE® READER® Mobile, and the like that includes a zoom feature.

When a user opens a document reader (an e-reader) for the first time, the preference determination module 118 displays sample text to a user for evaluation on the display 108. The sample text may be any number of words, sentences, or paragraphs in a pre-defined font, for example Arial, Tahoma, or Calibri. The preference determination module 118 prompts the user to adjust the zoom level of the displayed sample text such that the text is a size that may be read comfortably by the user. The preference determination module 118 measures and records the height, weight (boldness) and condensation (width/narrowness), in pixels, of the size adjusted font. The height, weight, and condensation are recorded as user preferences 122.

When the user later opens a document for viewing, the text modification module 120 determines the primary text of the document. The primary text is the main content of the document (e.g., the paragraph text) which does not include paragraph headings, headers and footers, endnotes or footnotes, annotations, images, graphics and the like. The text modification module 120 measures the height, weight, and condensation of the primary text at 100% zoom. The text modification module 120 adjusts the zoom of the primary text to meet the height preference in the user preferences 122. Based on the zoom level adjusted for the height preference, the text modification module 120 then adjusts the zoom level of the primary text based on the weight preference in user preferences 122. Finally, based on the zoom level adjusted for the weight preference, the text modification module 120 adjusts the zoom level of the primary text to match the condensation level recorded in user preferences 122. Based on the above adjustments, text modification module 120 displays the text on the display 108. Using the above-described arrangement, the text is ultimately brought to an optimum level at which the user is comfortable reading.

Figure 2:
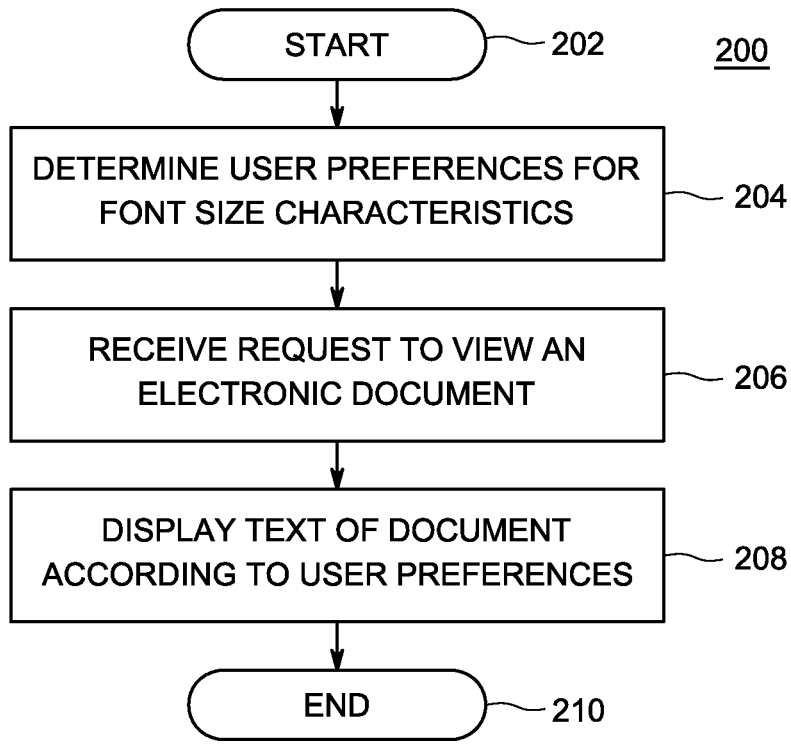
FIG. 2 depicts a flow diagram of a method for automatically improving legibility based on preferred font characteristics as performed by the text adjustment module of FIG. 1, according to one or more embodiments.

FIG. 2 depicts a flow diagram of a method 200 for automatically improving legibility based on preferred font characteristics, according to one or more embodiments. In one embodiment, the method 200 is performed by the text adjustment module 116 of FIG. 1. The method 200 determines the size characteristics of a font that are preferable to a user. The method 200 records the size characteristics and when a user accesses a document, the method 200 adjusts the text, regardless of the font, to possess similar size characteristics as recorded in the user preferences. The method 200 starts at step 202 and proceeds to step 204.

At step 204, the method 200 determines preferred font size characteristics for a user as described in more detail with respect to FIG. 3 below. The font size characteristics include a preferred height, weight, and condensation of text. The method 200 proceeds to step 206, where the method 200 receives a request to view an electronic document having text in a given font. The method 200 proceeds to step 208, where the method 200 displays the text in the electronic document in the given font with a zoom level based on the user preferences as described in further detail with respect to FIG. 4 below. The method 200 proceeds to step 210 and ends.

Figure 3:
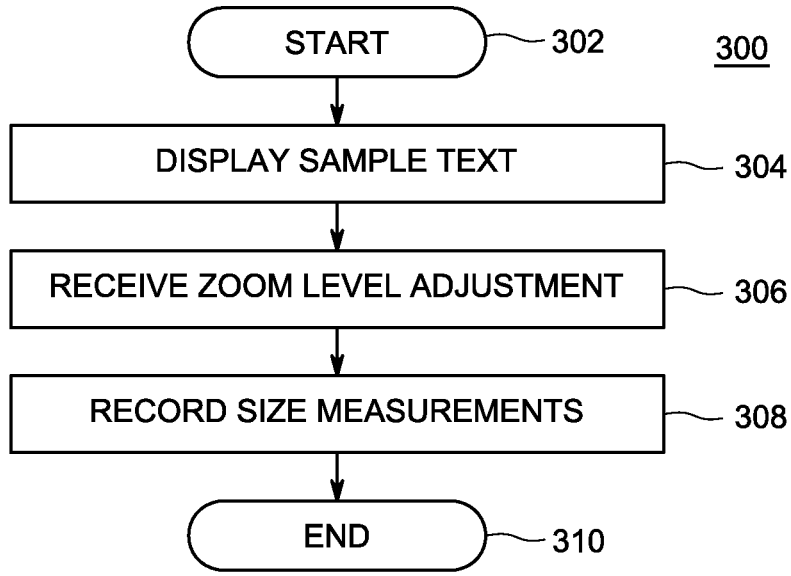
FIG. 3 depicts a flow diagram of a method for determining user preferences as performed by the preference determination module of FIG. 1, according to one or more embodiments.

FIG. 3 depicts a flow diagram of a method 300 for determining user preferences, according to one or more embodiments. In one embodiment, the method 300 is performed by the preference determination module 118 of FIG. 1. The method 300 displays sample text to a user who in turn adjusts the sample text to a size that is comfortable for the user to read. The size characteristics of the text are stored for later use. The method 300 starts at step 302 and proceeds to step 304.

At step 304, the method 300 displays sample text to a user. The sample text may be a few sentences or paragraphs in a pre-defined font, for example Arial, Tahoma, Calibri or the like. The sample text is initially displayed at 100% zoom level. Different letters have different heights, weights and condensation. For example, the capital letter "I" does not provide information about condensation, while the capital letter "W" is broader than other letters and hence provides incorrect condensation information. As such in one embodiment, the displayed text includes capitals letters from the set [A, B, D, E, F, H, K, L, M, N, P, R, T, U, V, X, Y, Z] that provide uniform height, weight, and condensation information. In another embodiment, all alphabet letters are used to determine height, weight, and condensation information.

The method 300 proceeds to step 306, where the method 300 receives a user input of an adjusted zoom level. The user adjusts the zoom level for legibility such that the sample text is of a size comfortable to the user for reading.

The method 300 proceeds to step 308, where the method 300 measures and records size measurements of the adjusted text. The method 300 measures the height, weight, and condensation of the adjusted font in the sample text. The height, weight, and condensation are measured in pixels. In one embodiment, the method 300 determines the measurements of the font by drawing the font in memory and multiplying the font by the dots per inch (DPI) of the display to calculate the measurement in pixels. The following code may be used to measure the drawn font in memory:

```
    RECT r = {0, 0, 0, 0 };
    CString s1(s.c_str( ));
    dc.DrawTextEx(s1, &r, DR_CALCRECT | DT_NOPREFIX |
DT_SINGLELINE, NULL);
    int w = r.right − r.left
```

The size measurements are recorded as user preferences. The properties of the adjusted sample text include height (in pixels), weight (in pixels), condensation (in pixels), zoom level (numeric percentage), sample font name (e.g., Calibri), and DPI of the display. The method 300 proceeds to step 310 and ends.

Figure 4:
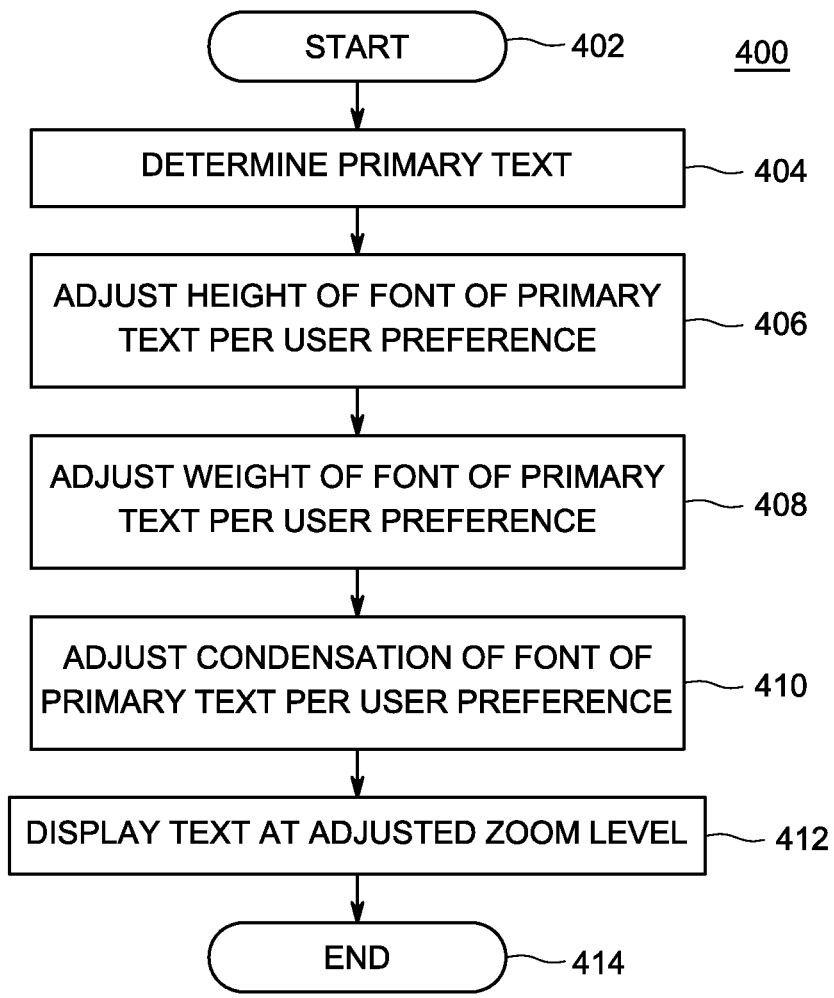
FIG. 4 depicts a flow diagram of a method for displaying the text in the electronic document according to the user preference, as performed by the text modification module of FIG. 1, according to one or more embodiments.

FIG. 4 depicts a flow diagram of a method 400 for displaying the size of the text in the electronic document according to the user preference, as performed by the text modification module 120 of FIG. 1, according to one or more embodiments. The method 400 adjusts display of the primary text of an electronic document to a size based on user preferences that were determined using method 300 above. The method 400 starts at step 402 and proceeds to step 404.

At step 404, the method 400 determines the primary text of an electronic document. The method 400 scans the document for paragraph text (i.e., text that is not a paragraph heading, a header or footer, an endnote or foot note, an annotation, an image, or the like). The method 400 determines the volume of text in different fonts in the electronic document. The font which has the most volume of text is determined to be the primary text. The properties of the font which has the most volume of text are used to adjust the zoom level of the electronic document.

The method 400 proceeds to step 406, where method 400 adjusts the height of the font of the primary text. The method 400 adjusts the zoom level of the primary text such that the font of the primary text has a height equal to the height preference in the user preferences. The method 400 measures the height (h) of the font of the primary text at 100% zoom. The method 400 then adjusts the zoom level such that the height (H) of the font of the primary text is equal to the preferred text height as specified in user preferences. The zoom level (Z) is calculated using the equation:

$$Z = \frac{H}{h} \times 100 \qquad \text{Eq. 1}$$

where:
Z is the zoom level,
H is the preferred height stored in user preferences, and
h is the height of the font of the primary text The method 400 proceeds to step 408, where the method 400 adjusts the weight of the font of the primary text. The weight is adjusted based on the zoom level (Z) measured in step 406. The method 400 measures the weight (w) of the font at the current zoom level (Z) and compares the weight (W) to the preferred weight in user preferences. If the weight (w) of the font of the primary text is greater than the preferred weight (W), the zoom level is decreased by a factor of:

$$\left[1 - \frac{(w-W)}{H}\right] \qquad \text{Eq. 2}$$

If the weight (w) of the font of the primary text is less than that of the preferred weight (W), then the zoom level is increased by a factor of:

$$\left[1 + \frac{(w-W)}{H}\right] \qquad \text{Eq. 3}$$

The new zoom level Z' after step 408 is:

$$Z' = Z * \left[1 \pm \frac{|W - w|}{H}\right] \quad \text{Eq. 4}$$

The method 400 proceeds to step 410, where the method 400 adjusts the condensation of the font of the primary text. The condensation is adjusted based on the new zoom level calculated in step 408. The method 400 compares the condensation (c) of the font of the primary text at the new zoom level Z' to the preferred condensation (C) in user preferences.

If the condensation (c) of the font of the primary text is greater than the preferred condensation (C), the new zoom level (Z') is decreased by a factor of:

$$\left[1 - \frac{(c - C)}{H}\right] \quad \text{Eq. 5}$$

If the condensation (c) of the font of the primary text is less than that of the preferred condensation (C), then the new zoom level (Z') is increased by a factor of:

$$\left[1 + \frac{(c - C)}{H}\right] \quad \text{Eq. 6}$$

The final zoom level Z" after step 410 is:

$$Z'' = Z' * \left[1 \pm \frac{|C - c|}{H}\right] \quad \text{Eq. 7}$$

The method 400 proceeds to step 412, where the method 400 displays the primary text at the adjusted zoom level. The adjusted zoom level is the final zoom level Z" that was calculated at step 410. The method 400 proceeds to step 414 and ends.

Figure 5A:
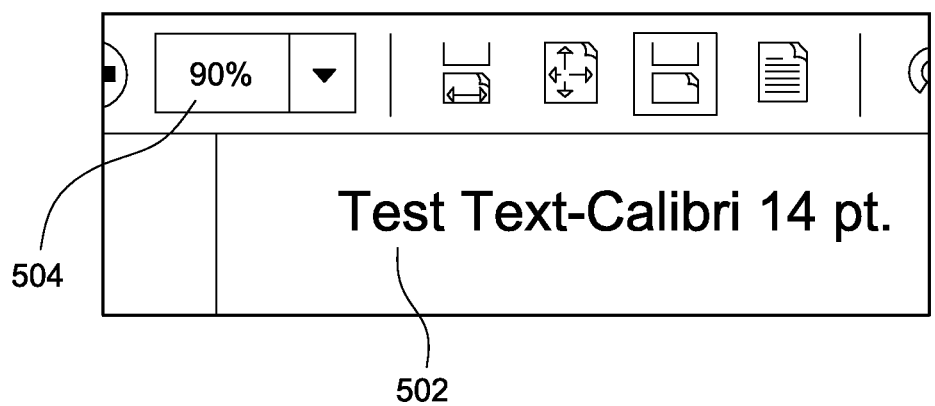
FIGS. 5A-5D collectively illustrate improving legibility based on preferred font characteristics, according to one or more embodiments.

FIGS. 5A-5D collectively illustrate improving legibility based on preferred font characteristics, according to one or more embodiments. FIG. 5A includes a display 500 including sample text 502. In this example, the font of the sample text 502 is Calibri 14 pt. The sample text 502 is initially displayed at 100% zoom level. A user is prompted to adjust the zoom level 504 such that the sample text 502 is at a comfortable level of readability. The user adjusts the zoom level 504 to 90%. As such, the sample text 502 displayed at 90% zoom level 504 provides a text size that is comfortable for the user to read.

Figure 5B:
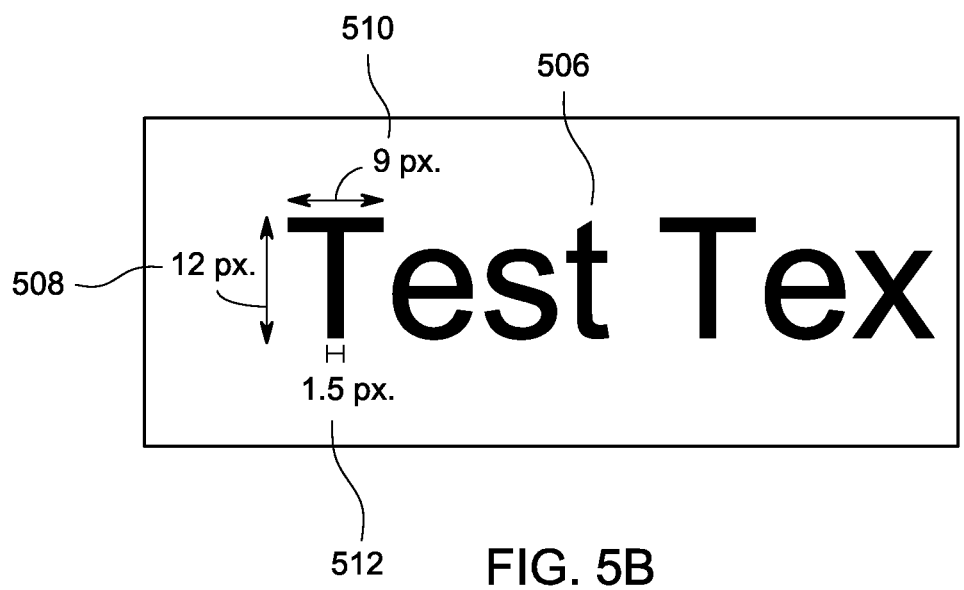

FIG. 5B illustrates measuring the preferred size characteristics. The sample text 502 is shown zoomed in as sample text 506 for illustration purposes. The sample text 506 is selected using a 'Device context' object handle. A device context is a data structure which contains information about a plurality of drawing attributes of the display. The logical coordinates of the sample text 506 are determined by using a GetTextMetrics function. The GetTextMetrics function fills a buffer pointer object with metrics for the sample text 506. The GetTextMetrics function requires the Device Context object handle and a pointer to a TEXTMETRIC structure that receives the text metrics, for example:

GetTextMetrics(hdc, &tm);

The textmetrics received from the above call contains all properties of the text including Height (tmHeight), width (tmAveCharWidth) and weight (tmWeight) of the font. The textmetrics are in logical units. To determine these textmetrics in pixels a scaling factor of the display is used for logical inch to pixel mapping. The ID2D1Factory::GetDesktopDpi method returns the DPI of the system in the X and Y coordinates. Once the DPI values for X and Y coordinates are known, the respective scaling factors for both X and Y coordinates are determined.

A sample code may be as follows:

```
    float g_DPIScaleX = 1.0f;
    float g_DPIScaleY = 1.0f;
void InitializeDPIScale(ID2D1Factory *pFactory)
{
    FLOAT dpiX, dpiY;
    pFactory->GetDesktopDpi(&dpiX, &dpiY);
    g_DPIScaleX = dpiX/96.0f; // 96 DPI is the standard value at
which logical units are configured.
    g_DPIScaleY = dpiY/96.0f;
}
```

Once the textmetrics of the font and the DPI scaling factor are determined the logical units per inch may be translated to pixels by multiplying units by the scaling factor. The horizontal (X) and vertical pixel values are obtained by multiplying the pixel values with the respective X or Y scaling factor. To determine height in pixels, the Y scaling factor is used while to determine the width and the weight in pixels, the X scaling factor is used. The height 508 is measured to be 12 pixels. The weight 512 is measured to be 1.5 pixels. The condensation 510 is measured to be 9 pixels. These measurements are stored in user preferences.

Figure 5C:
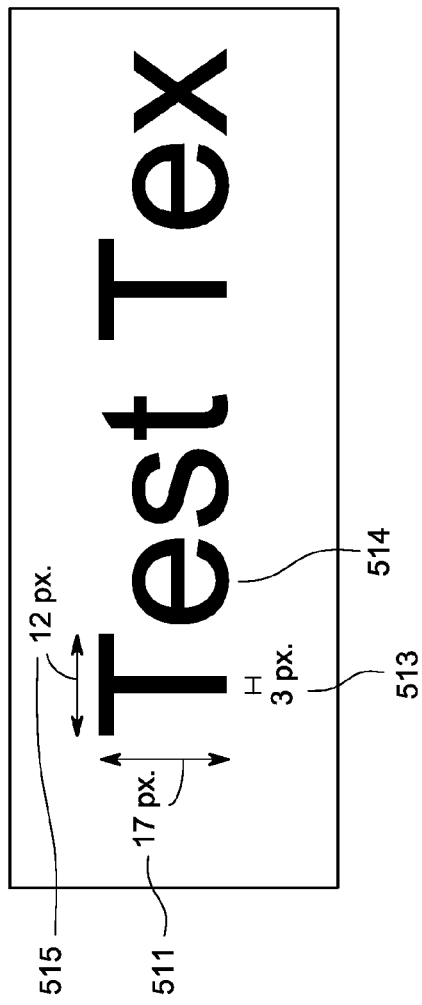
Figure 5D:
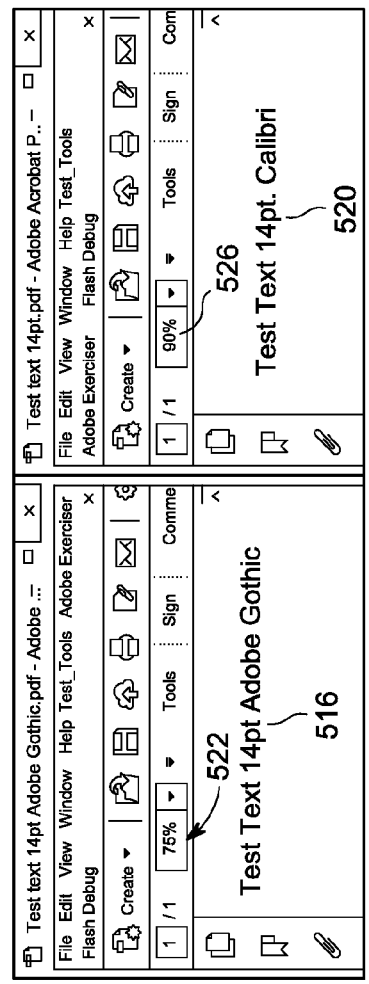

FIG. 5C illustrates a primary text 514 having a height 511 measured to be 17 pixels, a weight 513 measured to be 3.0 pixels and a condensation 515 measured to be 12 pixels. FIG. 5D illustrates an example of primary text 516 as, adjusted using method 400 to meet the user preferences. The font of primary text 516 is ADOBE Gothic 14 pt. To determine the zoom level for optimum legibility of the primary text 516 in Adobe Gothic font, the height (h) of the Adobe Gothic font is measured at 100% zoom as described above.

h=17 px (Adobe Gothic font at 100% zoom)

A first zoom level ($Z_h$) to bring the height (h) to user's legibility level is calculated as follows:

$$Z_h = \frac{12}{17} \times 100 = 70.58\%$$

The zoom level is adjusted to 71% for Adobe Gothic text. Next, the width (w) of the font is measured.

w=8 px, h=12 px (at 70.58% zoom)

A second zoom level ($Z_w$) to bring the width to user's legibility level is calculated as follows:

$$Z_w = 1 - \frac{8 - 9}{12} \times Z_h = 1 - (-0.803) \times 70.58 = 1.083 \times 70.58 = 76.43\%$$

The zoom level is adjusted to 76.43% for Adobe Gothic text. Next, the weight (c) and height (h) of the font is measured.

c=2 px, h=14 px (at 76.43% zoom)

A final zoom level to bring the weight to user's legibility level is calculated as follows:

$$Z_c = 1 - \frac{2 - 1.5}{14} \times Z_w =$$

$$1 - (-0.035) \times 76.43 = 10.9642 \times 76.43 = 73.70\% \sim 74\%$$

Therefore, 74% is the final level of zoom for Adobe Gothic text, at which the text will be optimally displayed as per the user's legibility preference.

As a result, the primary text 516 is similar is height, width and weight to the adjusted sample text 520 of Calibri 14 pt at 90%. The primary text is adjusted such that it is adjusted for display in accordance with the user preferences so as to be more legible to the user.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   determining a plurality of preferences regarding a plurality of font size characteristics of a sample text, wherein the plurality of preferences comprises a preferred height, a preferred weight, and a preferred condensation;
   receiving a request to view an electronic document having text in a given font;
   adjusting, by at least one processor, an initial zoom level of the text of the electronic document to a first zoom level based on the preferred height;
   adjusting, by the at least one processor, the first zoom level of the text to a second zoom level based on the preferred weight;
   adjusting, by the at least one processor, the second zoom level to a final zoom level based on the preferred condensation; and
   displaying text of the electronic document in the given font at the final zoom level based on the plurality of preferences.

2. The method of claim 1, wherein determining the plurality of preferences comprises:
   providing the sample text in a user interface that allows for user adjustment of a zoom level of the sample text; and
   after user adjustment of the zoom level of the sample text, analyzing the font size characteristics of the sample text to identify the preferred height, the preferred weight, and the preferred condensation.

3. The method of claim 1, wherein the font size characteristics are measured in pixels.

4. The method of claim 1, wherein displaying the text of the electronic document in the given font at the final zoom level based on the plurality of preferences comprises:

displaying the text of the electronic document at the initial zoom level; and changing the display of the text of the electronic document from the initial zoom level to the final zoom level.

5. The method of claim 1, wherein adjusting the initial zoom level of the text of the electronic document to the first zoom level comprises:

determining a primary text in the electronic document;

measuring a height of the primary text at 100% zoom level; and calculating the first zoom level such that the height of the primary text matches the preferred height in the plurality of preferences.

6. The method of claim 1, wherein adjusting the first zoom level of the text to the second zoom level comprises:

measuring a weight of a primary text in the electronic document at the first zoom level;

comparing the measured weight of the primary text to the preferred weight in the plurality of preferences, and adjusting the first zoom level of the text in the electronic document to the second zoom level based on a difference between the measured weight of the primary text and the preferred weight in the plurality of preferences.

7. The method of claim 1, wherein adjusting the second zoom level to the final zoom level comprises:

measuring a condensation of a primary text in the electronic document at the second zoom level;

comparing the measured condensation of the primary text to the preferred condensation in the plurality of preferences; and calculating the final zoom level based on a difference between the measured condensation of the primary text and the preferred condensation in the plurality of preferences.

8. An apparatus for automatically improving legibility based on preferred font characteristics comprising:

a computer having one or more processors;

a non-transitory storage medium comprising instructions, that when executed by the one or more processors, cause the apparatus to:

determine a plurality of preferences regarding a plurality of font size characteristics of sample text, wherein the plurality of preferences comprises a preferred height, a preferred weight, and a preferred condensation;

adjust an initial zoom level of text of an electronic document to a first zoom level based on the preferred height;

adjust the first zoom level of the text to a second zoom level based on the preferred weight;

adjust the second zoom level to a final zoom level based on the preferred condensation; and display the text of the electronic document at the final zoom level based on the plurality of preferences.

9. The apparatus of claim 8, wherein the preferred height, the preferred weight, and the preferred condensation are measured in pixels.

10. The apparatus of claim 8, wherein the instructions, when executed by the one or more processors, cause the apparatus to adjust the second zoom level of the text of the electronic document to the final zoom level by performing steps comprising:

multiplying the second zoom level by one plus a difference between a condensation of the text and the preferred condensation divided by the preferred height.

11. The apparatus of claim 8, wherein adjusting the initial zoom level to the first zoom level comprises:

determining a primary text in the electronic document;

measuring a height of the primary text at 100% zoom level; and calculating the first zoom level such that the height of the primary text matches the preferred height in the plurality of preferences.

12. The apparatus of claim 8, wherein adjusting the first zoom level of the text to the second zoom level comprises:

measuring a weight of a primary text in the electronic document at the first zoom level;

comparing the measured weight of the primary text to the preferred weight in the plurality of preferences; and calculating the second zoom level based on a difference between the measured weight of the primary text and the preferred weight in the plurality of preferences.

13. The apparatus of claim 8, wherein adjusting the second zoom level to the final zoom level comprises:

measuring a condensation of a primary text in the electronic document at the second zoom level;

comparing the measured condensation of the primary text to the preferred condensation in the plurality of preferences; and calculating the final zoom level based on a difference between the measured condensation of the primary text and the preferred condensation in the plurality of preferences.

14. A non-transitory computer readable medium for storing computer instructions that, when executed by at least one processor cause the at least one processor to perform a method for automatically improving legibility based on preferred font characteristics comprising:

determining a plurality of preferences regarding a plurality of font size characteristics of a sample text, wherein the plurality of preferences comprise a preferred height, a preferred weight, and a preferred condensation of the sample text;

receiving a request to view an electronic document having text in a given font;

adjusting the text of the electronic document to a first zoom level based on the preferred height;

adjusting the first zoom level to a second zoom level to adjust the text to the preferred weight;

adjusting the second zoom level to a final zoom level to adjust the text to the preferred condensation; and displaying the text of the electronic document in the given font at the final zoom level based on the plurality of preferences.

15. The computer readable medium of claim 14, further comprising instructions that, when executed by at least one processor, cause the at least one processor to perform steps comprising:

providing the sample text in a user interface that allows for user adjustment of a zoom level of the sample text; and after user adjustment of the zoom level of the sample text, measuring the font size characteristics of the sample text to identify the preferred height, the preferred weight, and the preferred condensation.

16. The computer readable medium of claim 14, wherein the font size characteristics are measured in pixels.

17. The computer readable medium of claim 14, wherein adjusting the first zoom level to theft second zoom level to adjust the text to the preferred weight comprises:

adjusting the first zoom level by multiplying the first zoom level by one plus a difference between a weight of the text and the preferred weight divided by the preferred height.

18. The computer readable medium of claim 14, wherein adjusting to the first zoom level comprises:
   determining a primary text in the electronic document;
   measuring a height of the primary text at 100% zoom level; and
   adjusting the text in the electronic document to the first zoom level such that the height of the primary text matches the preferred height in the plurality of preferences.

19. The computer readable medium of claim 14, wherein adjusting the first zoom level to theft second zoom level comprises:
   measuring a weight of a primary text in the electronic document at the first zoom level;
   comparing the measured weight of the primary text to the preferred weight in the plurality of preferences; and
   calculating the second zoom level based on a difference between the measured weight of the primary text and the preferred weight in the plurality of preferences.

20. The computer readable medium of claim 14, wherein adjusting the second zoom level to the final zoom level comprises:
   measuring a condensation of a primary text at the second zoom level;
   comparing the measured condensation of the primary text to the preferred condensation in the plurality of preferences; and
   calculating the final zoom level based on a difference between the measured condensation of the primary text and the preferred condensation in the plurality of preferences.

* * * * *